March 12, 1968  P. H. MILLER, JR  3,373,426
METHOD AND SYSTEM FOR RANGE AND RELATIVE VELOCITY DETECTION
Filed April 1, 1966  5 Sheets-Sheet 1
Fig 1
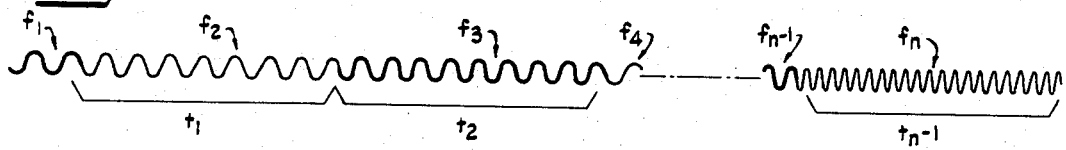
Fig 2
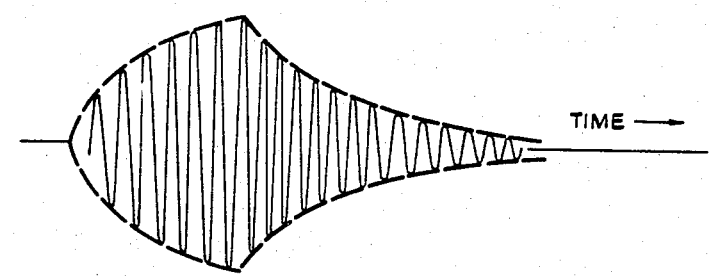
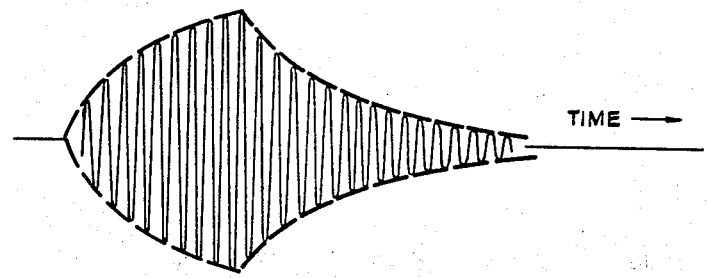
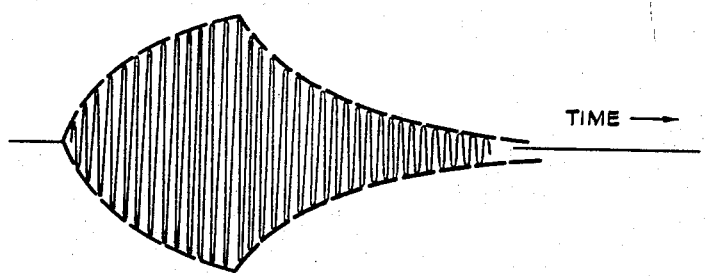
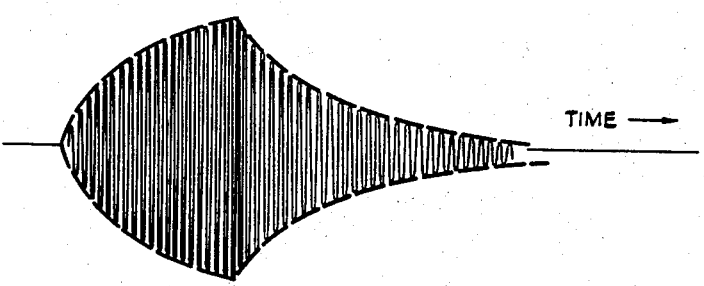
Fig 3
INVENTOR
PARK H. MILLER, JR.
BY Anderson, Luedeka, Fitch, Even & Tabin
ATTORNEYS

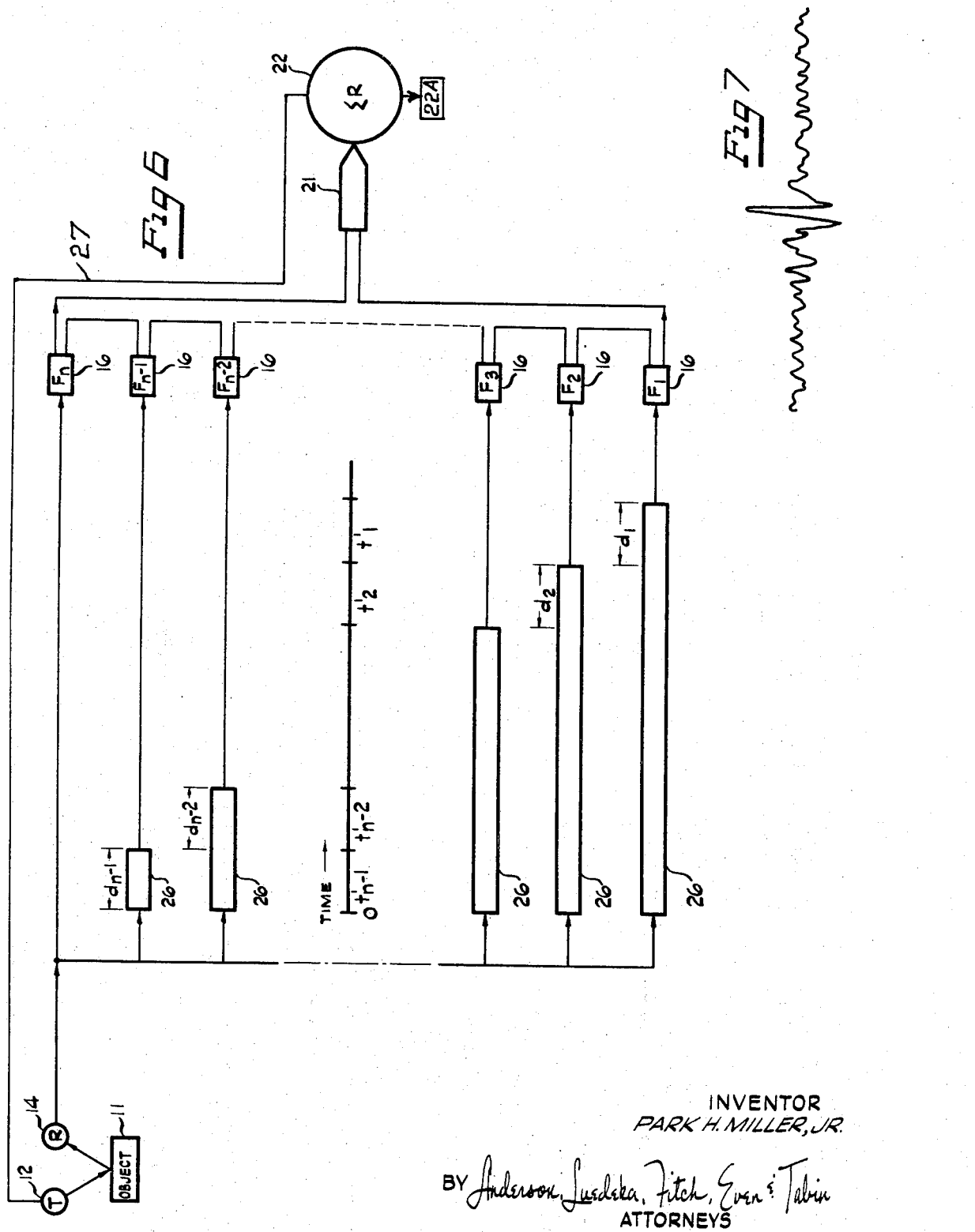

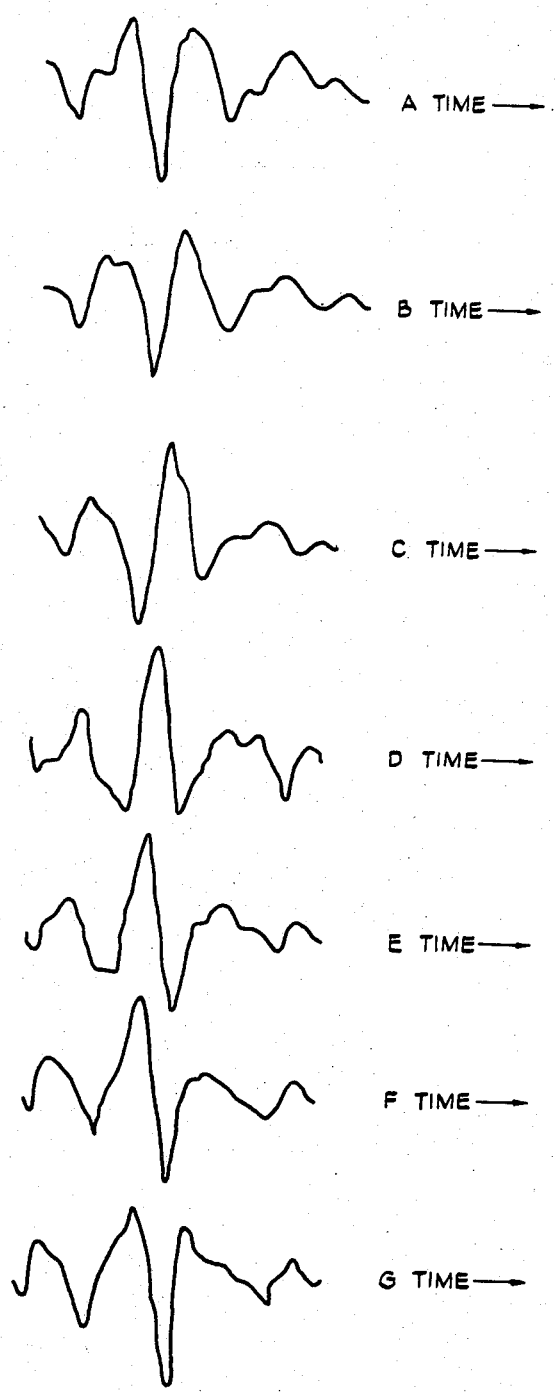

March 12, 1968 P. H. MILLER, JR 3,373,426
METHOD AND SYSTEM FOR RANGE AND RELATIVE VELOCITY DETECTION
Filed April 1, 1966 5 Sheets-Sheet 5

INVENTOR
PARK H. MILLER, JR.

BY Anderson, Luedeka, Fitch, Even & Tabin
ATTORNEYS

United States Patent Office 3,373,426
Patented Mar. 12, 1968

3,373,426
METHOD AND SYSTEM FOR RANGE AND RELATIVE VELOCITY DETECTION
Park H. Miller, Jr., Del Mar, Calif., assignor, by mesne assignments, to Gulf General Atomic Incorporated, San Diego, Calif., a corporation of Delaware
Filed Apr. 1, 1966, Ser. No. 539,352
29 Claims. (Cl. 343—7.7)

ABSTRACT OF THE DISCLOSURE

A method and apparatus for detecting relative motion of two objects in a medium is provided in which short single frequency wave trains are applied to the medium with predetermined cycles having first time relationships. After the wave trains have traveled between the objects detection signals are produced which are systematically related to the applied wave trains and which each have a cycle corresponding to the predetermined cycle of the applied wave train. The detection signals are then combined with these corresponding cycles in second time relationships to provide a compressed pulse. Relative motion of the objects may cause a change in the shape of this pulse which may be adjusted by changes in either the first or second time relationships. Any or all of these changes are then utilized to determine the relative motion.

---

This invention relates generally to methods and systems for detecting range and relative motion and, more particularly, to a method and system for detecting the range and relative velocity of two objects in a medium by utilizing pulse compression techniques.

In general, systems for the detection of range and velocity, such as sonar and radar, operate by transmitting energy in the form of waves in a medium and detecting the waves after they have traveled through the medium. Such systems are described as "active" systems when they include both means for transmitting the waves and means for detecting the waves. The term "passive" is applied to range and velocity detection systems when they do not include means for transmitting the waves and the waves which are detected originate outside of the system. Range has been determined by measuring the travel time of the waves between the transmitter and the detector and utilizing the known velocity of propagation of the waves in the medium to convert this into units of length as an indication of the range. The relative velocity is determined in some systems of the prior art by comparing range at known time intervals. In other systems of the prior art the Doppler shift in apparent frequency of the received waves from the frequency of the transmitted waves is used as an indication of the relative velocity.

In order to overcome the effects of noise added to the signal before or upon detection thereof, it is generally desirable to increase the amount of primary transmitted energy applied to the medium, thereby increasing the signal-to-noise ratio. In any system, however, the rate at which energy may be applied to the medium is subject to the physical limitations of the system components. Consequently, it is sometimes expedient to apply the energy of the signal over a longer period of time and therby increase the total energy in the transmitted signal. on the other hand, as the duration of the waves applied to the medium is increased, it becomes more difficult to determine the range because the waves are received and detected over longer periods of time and the measurement of their travel time becomes increasingly uncertain. Accordingly, for good range resolution it is desirable to use pulses of energy or wave trains having relatively limited duration. One approach to the problem of optimizing both the signal-to-noise ratio and the range resolution is to transmit a plurality of wave trains separately and combine the received wave trains into signals of short duration and high energy.

One such method of pulse compression or wave train compression in which the final desired signal may be produced without excessive delay for processing the detected wave trains includes applying a plurality of short wave trains or pulses to a medium, with each of the pulses being at a different respective frequency and of limited duration. The wave trains which are detected after passage through the medium are combined in a predetermined time relationship which, preferably, is such that the detected wave trains would be in phase during one cycle of each detected wave train but for changes in the time relationships of such cycles as are occasioned by the passage of the wave trains through the medium. The resulting composite signal is similar in form to the so-called Ricker wavelet and to the waveforms produced by autocorrelation techniques. The peak of the wavelet may be time related to a reference datum so as to be indicative of the time of travel of the waves through the medium and hence of range.

An important feature of the present invention is to provide a method and system of pulse compression in which the relative motion or velocity of objects may be detected, separately or in addition to the range of the objects. This is achieved by utilizing both the differences between the time relationships of the applied wave trains and the time relationships in which the detected waves are combined and the differences between the composite signal thereby produced and a composite signal as produced when there is a predetermined relative motion of the objects to provide an indication of the actual relative motion. More particularly, in one embodiment of the invention the respective time relationships are adjusted so that all the information as to relative velocity is contained in the waveforms or peak positions of the composite signals. on the other hand, in another embodiment the waveform of a composite signal is adjusted so that all of such information is contained in the respective time relationships. The method is applicable to systems of both the active and passive type, although in the case of passive systems the object detected would be required to transmit waves of a predetermined nature.

It is therefore an important object of the invention to provide an improved method and system for detecting the relative motion and velocity of objects.

Another object of the invention is to provide an improved method and system for determining relative velocity with which range may also be determined.

A further object of the invention is to provide a reliable, sensitive and rapid method of determining relative velocity utilizing a pulse compression technique.

A still further object of the invention is to provide a method and system for detection of range and velocity in which information may be isolated in either measurable time relationships or in the waveforms or peak positions of composite signals.

Yet another object of the invention is to provide a method for range and velocity detection which is useful in both active and passive systems.

Still another object of the invention is to provide a useful solution to the problem of how to achieve high signal-to-noise ratios in systems for the detection of range and velocity without undue sacrifice of range resolution.

Other objects and advantages of the invention will become apparent from the following description when considered in conjunction with the accompanying drawings in which:

FIGURE 1 is an illustration of a typical transmitted signal utilized in practicing the invention;

FIGURE 2 is an illustration of a typical signal as received after the passage of the transmitted signal through the medium and the consequent addition of noise;

FIGURE 3 shows certain typical, idealized waveforms as produced by filtering the received and detected signal as described herein;

FIGURE 6 is a diagrammatic illustration of the system including a delay line apparatus which may be utilized in practicing the invention;

FIGURE 7 is an illustration of a typical combined signal as produced by practicing the present invention;

FIGURE 8 illustrates typical composite signals produced when the objects have different relative velocities;

Figure 4:
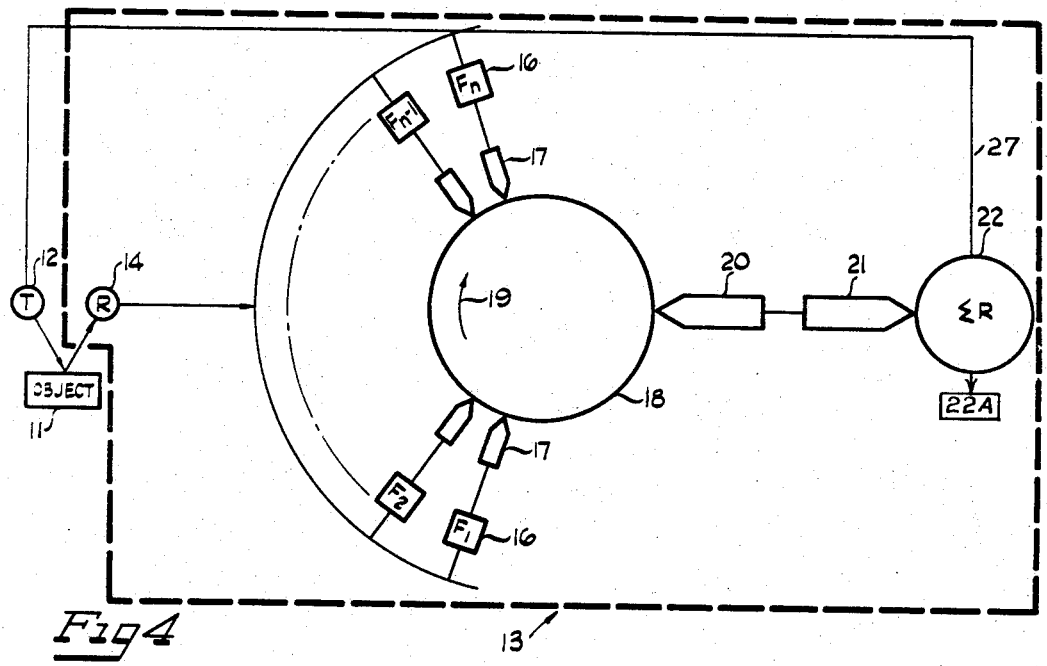
FIGURE 4 is a diagrammatic illustration of the system including magnetic recorder apparatus which may be utilized in practicing the invention.

In accordance with the present invention, the improved method of detecting relative motion of objects generally includes applying to a medium one or more transmitted signals comprising a plurality of wave trains of limited duration and different respective frequencies and in first time relationships. After the wave trains have traveled between the objects, they are detected and utilized to produce detection signals which are systematically related to the received wave trains. The detection signals are then combined in second time relationships to produce one or more composite signals. The differences between the first and second time relationships as well as the differences between the composite signal produced and a composite signal as produced when the objects have a predetermined relative motion are both related to the relative motion of the objects and may be utilized to indicate such relative motion.

It will be apparent that the invention may be utilized in conjunction with both the active and passive type systems as defined above. For convenience and clarity, however, the invention generally will be described herein in terms of an active system, although no such limitation of the scope of the invention is to be implied.

Furthermore, the nature of the medium and wave utilized is not critical except that the object to be detected in an active system must be capable of reflecting the particular type of waves employed. For example, radio waves in a variety of frequency bands might be utilized as could sound waves in a liquid medium, or seismic waves traveling in the earth. For convenience, the invention will be described herein primarily with reference to low frequency sound waves traveling through water, such as may be produced by the apparatus described in my copending application entitled "Method and Apparatus for Generating Sound Waves," Ser. No. 539,365, filed Apr. 1, 1966, but no unnecessary limitation of the invention is to be implied therefrom.

In a specific exemplary mode of operation of the present invention, with reference to which the invention generally will be described herein, the frequencies of sound utilized range between 36.0 cycles per second and 99.0 cycles per second and are distributed linearly, i.e., there is a constant frequency differential between adjacent frequencies. The wave trains of each frequency in this example are of substantially equal duration and the number of cycles in each wave train is selected to meet this criterion. More specifically, the set of frequencies, number of cycles of each and duration of each wave train in this example are shown in Table I.

TABLE I

| Frequency cps. | Number of cycles | Wave train duration, sec. |
| --- | --- | --- |
| $f_1$–36.0 | 7 | .194 |
| $f_2$–40.5 | 8 | .198 |
| $f_3$–45.0 | 9 | .200 |
| $f_4$–49.5 | 10 | .202 |
| $f_5$–54.0 | 11 | .204 |
| $f_6$–58.5 | 12 | .205 |
| $f_7$–63.0 | 13 | .206 |
| $f_8$–67.5 | 14 | .207 |
| $f_9$–72.0 | 15 | .208 |
| $f_{10}$–76.5 | 16 | .209 |
| $f_{11}$–81.0 | 17 | .210 |
| $f_{12}$–85.5 | 18 | .211 |
| $f_{13}$–90.0 | 19 | .211 |
| $f_{14}$–94.5 | 20 | .212 |
| $f_{15}$–99.0 | 21 | .212 |

The average frequency is 67.5 cycles per second and the average wave train duration is .206 sec. for this specific set of wave trains. It may also be noted that the duration of each wave train is less than the reciprocal of $\Delta f$, the difference between successive frequencies, in order to minimize side lobes in the composite signal produced as described below.

One among many advantages of this particular selection of frequencies and wave train lengths, is that the composite signals produced in the manner to be hereinafter described will not be appreciably altered if one, or even a few, frequencies are omitted from the set in order to avoid particular ambient noise frequencies. Also, additional frequencies in the same linear set may be added at either end or the entire set shifted up or down in the frequency spectrum without appreciable effect on the composite signal. Furthermore, the frequencies may easily be produced by the apparatus of my copending application "Method and Apparatus for Generating Sound Waves" mentioned hereinabove.

It should be emphasized, however, that the above described set of frequencies is merely exemplary and is described herein for clarity and ease of understanding. The distribution of frequencies need not be linear, and, indeed, secondary maxima in the composite signal may be minimized if a non-linear set is used. In the case of systems operating with sound waves traveling in water, it may be desired to work at higher frequencies because attenuation at high frequencies is not as great in water as in other media, and one can build transducers which are directional and highly efficient at high frequencies.

The wave trains which are applied to the medium and comprise each transmitted signal have first fixed or determinable time relationships with each other. As shown in FIGURE 1, which illustrates some of the transmitted wave trains, these time relationships are such that the wave trains are successively applied to the medium beginning with the lowest frequency $f_1$, and proceeding to the highest frequency $f_n$ at first time intervals (designated as $t_1, t_2, \ldots t_n-1$, where $n$ is the number of frequencies and wave trains utilized) between the last cycles of successive transmitted wave trains, although other predetermined cycles of the wave trains may be used as reference points for measuring these intervals. As shown, these first time intervals are preferably made about equal to the duration of the respective pulses and, with the parameters of Table I, the total duration of each transmitted signal is about 3 seconds. It would be possible however, for the first time intervals to be such that the transmitted wave trains in a particular transmitted signal overlap one another. In addition, the order of transmission of the frequencies may be varied, as for example, beginning with the highest frequency $f_n$ and proceeding to the lowest frequency $f_1$. A particular useful application of such an order of transmission will be described below, but for ease of understanding, reference will generally be made to the first mentioned or ascending order of transmission of frequencies.

After the wave trains have traveled between the two objects whose relative motion is to be detected, detection signals are produced. More specifically, in terms of an active system the wave trains are detected after the waves have traveled from the transmitter to the object and have been reflected from the object to the receiver. In an underwater sound system such as described in my previously mentioned copending application entitled "Method and Apparatus for Generating Sound Waves," the sound waves would be detected by conventional hydrophones having a transducer means to produce an electrical output signal.

The signals received are affected by noise which may have much greater amplitude than the transmitted waves. In such a case the received signal may have an appearance as shown in FIGURE 2. The effect of such noise added to the signal during its passage through the medium may be much reduced by detecting each frequency through its own narrow band filter. It would also be possible to reduce noise by utilizing correlation techniques between the transmitted and received signals. It is preferred in the present invention, however, to utilize simple filters which operate in real time so that the processing time often required with correlation techniques is eliminated. Two specific examples of such filters will be described hereinafter. When utilizing wave trains of short finite length, the envelope of the output of such filters gradually increases, reaching a peak with the last wave of the train and thereafter gradually diminishing. The form of typical detected wave trains after they have passed through such filters is shown in FIGURE 3. The signals which are the output of the filters are then combined into a composite signal in second fixed or determinable time relationships. It is an important feature of the present invention to utilize the interdependence of the first time relationships, the second time relationships and the waveform of the composite signal to determine the range and/or relative velocity of the objects.

An apparatus for accomplishing the detection and combination of the signals, which is particularly useful where the range of frequencies employed is from 0 to 50,000 cycles per second, is illustrated in FIGURE 4, wherein the waves are reflected from an object 11. As shown in FIGURE 4, this apparatus generally comprises a transmitter 12 and a recording system 13 having a receiver 14 which detects the transmitted wave trains and converts them into electrical signals. The electrical signal produced by the receiver 14 in response to the transmitted waves is applied to a plurality of filters 16 arranged in parallel, each of which is pretuned to one of the transmitted frequencies. Since the frequencies are transmitted successively, during any given period of time when signals are being received and applied to all the filters, the output of one of the filters is similar to one of the waveforms shown in FIGURE 3 while the output of the other filters is essentially zero until the peak of the signals occurs, when the output of the filter for the next received frequency starts up. The output of each filter is applied to a respective recording head 17 which then records the signals for the respective selected frequency on a record medium mounted on a magnetic drum 18 rotating in the direction of the arrow 19.

The recording heads 17 are located at selected points axially and circumferentially spaced along the surface of the recording drum 18 which rotates at a predetermined velocity. The result is that the filtered signal related to each transmitted wave train is recorded on a separate parallel track of the record medium. Records produced on the recording tracks by the heads 17 may then be combined by a read-out device 20. The read-out device 20 may be a single wide pickup head covering all the recording tracks. The recorded detection signals are combined by the pickup head which preferably includes an integrating amplifier so that the output thereof is proportional to magnetic flux rather than to the time rate of change of flux, as is true for ordinary reading heads. The combined signal may then be recorded by a stylus 21 on a combined signal recorder 22.

The velocity of rotation of the recording drum 18 and the relative circumferential spacing of the recording heads 17 determine the second time relationships in which the detected signals are combined. The separate detection signals recorded on the drum 18 by the heads 17 also have time relationships which are systematically related to the first time relationships of the applied wave trains and to the relative motion of the objects between which the waves have traveled. Both the form of the composite signal produced by combining the recorded detection signals and the differences between the first time relationships and the second time relationships are indicative of the relative motion of the objects.

It is apparent that the position of the filters 16 relative to the other parts of the system 13 may be modified. For example, in the system shown in FIGURE 5, the signal received by the receiver 14 is applied through a single first recording head 23 to a single recording track on a recording drum 18 rotating in the direction of the arrow 24. A plurality of read-out heads 25, each of which includes an integrating amplifier and which is connected to one of the filters 16, are located at selected points circumferentially spaced around the drum 18. The output of the filters may be applied in series through the recording head 21 to the combined signal recorder 22. The velocity of rotation of the drum 18 and the relative circumferential spacing of the read-out heads 25 determine the second time relationships in which the detected signals are combined utilizing the system shown in FIGURE 5.

Another apparatus, which is particularly useful in the frequency range from 5,000 cycles per second to one megacycle per second, is shown in FIGURE 6. In this apparatus the signal received by the receiver 14 is put into a plurality of delay lines 26 arranged in parallel and providing various lengths of time of signal delay. The delayed signal from each delay line is applied to a respective one of a plurality of filters 16, the outputs of which may be combined serially and applied to the recording device 21 and recorded on a combined signal recorder 22. The lengths of the delay lines determine the second time relationships in which the detected signals are combined when this form of apparatus is used.

Figure 5:
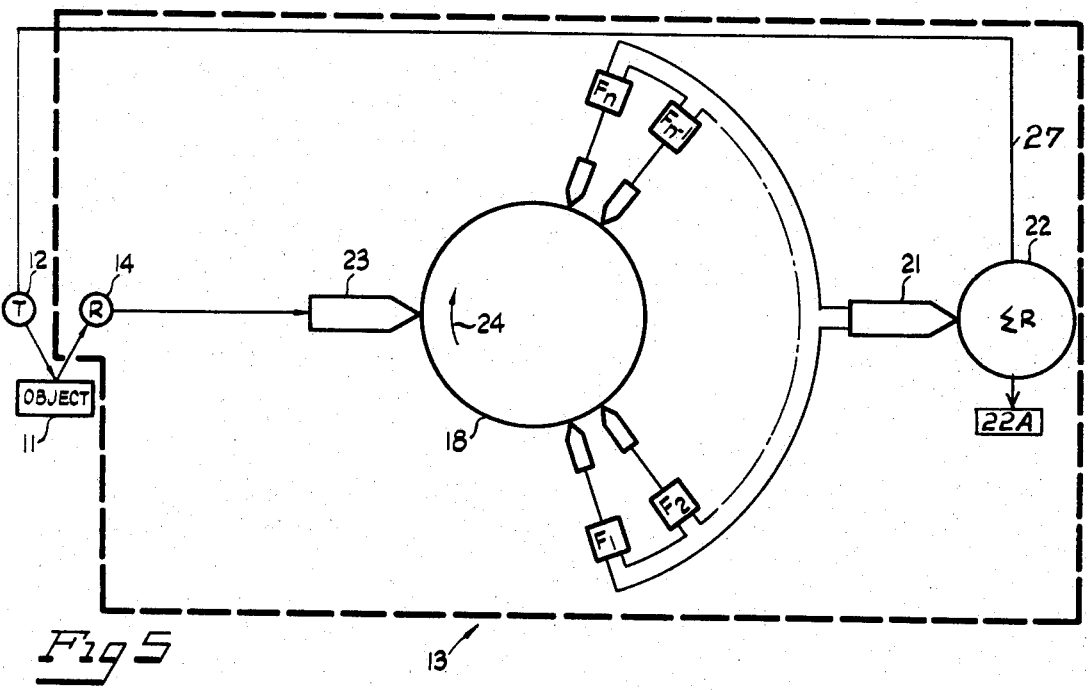
FIGURE 5 is a diagrammatic illustration of the system including a modified magnetic recorder apparatus which may be utilized in practicing the invention.

The apparatus shown in FIGURES 4, 5 and 6 each perform the function of delaying relative to each other the received signals corresponding to the respective transmitted frequencies by a fixed or determinable amount before they are combined. The amount of this delay is shown most clearly in FIGURE 6 where the differences in length of adjacent delay lines 26 (designated as $d_1, d_2, \ldots d_n-1$ where $n$ is the number of wave trains) divided by the velocity of propagation of the waves in the lines equals the respective relative delay times (designated as $t'_1, t'_2, \ldots t'_n-1$) of the received signals (designated as $f_2, f_3, \ldots f_n$). Similarly in FIGURE 4, the differences in the circumferential distance of each recording head 17 from the head connected to the filter $F_1$ tuned to the frequency $f_1$ of the wave trains divided by the tangential velocity of the drum 18 equals the respective relative delay time for each respective frequency and in FIGURE 5 the differences in the circumferential distances of the read-out heads 25 from the recording head 23 divided by the velocity of the drum equal the relative delay times.

In the specific exemplary mode of operation of the invention which has been previously mentioned, the transmitted wave trains in each transmitted signal have first time intervals (designated at $t_1, t_2, \ldots t_n-1$) between predetermined cycles of successive wave trains, preferably the last cycle of such wave trains. Utilizing the apparatus of FIGURE 4, the spacing of the recording heads 17 or the velocity of the drum 18 may be adjusted so that the detection signals when combined by the read-out device 20 are all in phase during one predetermined cycle of each wave train as produced by the respective filters 16. More particularly, it is preferred to have the signals in phase during the cycle of each which corresponds to the last cycle of the respective applied wave trains. It may be seen from examination of the waveforms shown in FIGURE 3 that this cycle is the central cycle of each output signal as produced by the preferred filters and that this cycle, as also shown in FIGURE 3, has the largest amplitude of each respective wave train. As a result of this mode of combining the filter output signals so that these central peak cycles coincide, the composite signal has a sharp peak corresponding to the time of the last transmitted cycle, while at other times the signals on the average substantially cancel one another out. In the case where the relative velocity of the two objects is zero the spacing of the recording heads 17 may be adjusted to accomplish this result by making the relative delay times ($t'_1$, $t'_2$, ... $t'_n-1$) equal to the first time intervals ($t_1$, $t_2$, ... $t_n-1$). The form of the composite signal produced is as shown in FIGURE 7. Similar results may be obtained utilizing the apparatus of FIGURE 5 by adjusting the spacing of the readout heads 25 or the velocity of the drum 18, and utilizing the apparatus of FIGURE 6 by adjusting the lengths of the delay lines 26.

A convenient means of combining the filter outputs in this manner, which also is useful in determining the range of an object, includes relating the record of the detection signals to the time of travel of the waves from the time they are applied to the medium until the time they are detected. When this means is utilized, it is more accurate to refer to the first and second time relationships of the predetermined or last cycles of the wave trains with a time reference datum rather than to first time intervals and relative delay times of cycles of the wave trains with respect to each other. Relating the record of the detection signals to the travel time may be easily accomplished in an active system by having the control system for the wave transmitter also start the recorder time, or where the recording system is cyclical, by starting the operation of the control of the transmitter at a particular time in the cycle of the recording system. This may be done, for example, by using a microswitch at a particular point on the recording drum connected by a conductor 27 to the transmitter 12. In any event, in some convenient and conventional manner, the time of the record made upon the recorder is related to the time of application of the wave trains to the medium and thus provides a record of received waves as a function of time with the time of application of the waves as a reference datum. Where the velocity of propagation is known the range may then be easily determined. If the received signals are separately recorded on separate recorders for each frequency, as is done with the separate tracks of the apparatus shown in FIGURE 4, each record is a measure of the detected wave train as a function of time related to a common reference datum. The read-out device 20 will then produce on the combined signal recorder 22 a composite signal which is a function of time. The form of the composite signal when the detection signals are thus combined is as shown in FIGURE 7 and the position of the central peak relative to the reference datum is indicative of the travel time of the waves, from which the range of the objects may be determined when the velocity of propagation is known. Similar results may be easily obtained utilizing the apparatus shown in FIGURES 5 and 6.

The above description has related primarily to the case where the relative velocity of the two objects is zero. When there is relative motion of the objects certain changes in the detected signals will result. According to the well-known Doppler effect, the apparent frequency of the detected wave trains will be shifted by an amount which is proportional to the ratio of the relative velocity of the objects to the velocity of propagation of the waves in the medium and to the true frequency. If such an effect is appreciable, satisfactory operation of the system will require adjustment of the filters 16 to the shifted apparent frequencies of the detected wave trains.

Furthermore, if there is an appreciable change of range between the time of receipt of successive pulses due to the relative motion of the objects, it will be found that the relative amplitude of successive pulses is changed and the waveform of the composite signal will thereby be distorted. However, this effect is in general not appreciable and for practical results no compensation therefore is required.

For purposes of practicing the present invention, however, the significant change caused by relative motion of the objects is a change in the differences between the first and second time relationships. This change, in turn, will affect the waveform of the composite signal including both its shape and the position of its peak unless compensation therefor is provided. More particularly, assuming for purposes of illustration that the first time relationships are fixed and the objects are receding from each other, the total duration of the series of wave trains which are detected will be increased, as will the time intervals between the predetermined cycles of successive detected wave trains. Conversely, if the objects are approaching each other, the total duration of the detected signal or series of pulses and the time intervals between such predetermined cycles will be decreased. The amount of these respective changes, i.e., in total duration and in time intervals between the detected predetermined cycles, will be proportional to the duration of the transmitted signal and the time intervals between successive transmitted predetermined cycles, respectively, and both changes will be proportional to the ratio of the relative velocity of the objects to the velocity of propagation of the waves in the medium. Such changes in the time relationships of the detected signals will affect the waveform of the composite signal unless the second time relationships in which the detected signals are combined are appropriately modified. Accordingly, the shape and the position of the peak of the composite signal produced, if no change is made in the second time relationships, will by themselves be indicative of the relative motion of the objects.

An illustration of this effect is shown in FIGURE 8, which shows the effect on the composite signal of changes in the total duration of a series of received pulses from the total duration of the transmitted pulses. The middle waveform labeled D is that which is produced when there is no relative motion of the objects and the first time relationships correspond to the second time relationships. The upper waveforms labeled C, B and A illustrate the combined signal resulting when the objects are receding from each other at different rates, which rates increase going from C to A. The lower waveforms labeled E, F and G show the signals resulting when the objects are approaching each other at different rates, which rates increase going from E to G. Specifically, these waveforms were produced utilizing the frequencies and pulse lengths set forth in Table I, beginning with frequency $f_1$ and proceeding to frequency $f_{15}$, and having predetermined first time intervals ($t_1$, $t_2$, ... $t_{14}$) between the last cycles of successive transmitted wave trains. The detected signals were combined in second time relationships such that the time intervals between the cycles of the detected signals corresponding to the last cycles of the applied wave trains were each reduced by the respective first time intervals. Another way of describing the same procedure is that the respective relative delay times ($t'_1$, $t'_2$, ... $t'_n-1$) are made the same as the respective first time intervals ($t_1$, $t_2$, ... $t_n-1$). Time changes of ±9 milliseconds, ±6 milliseconds and ±3 milliseconds in the total duration of each series of wave trains were introduced to produce the respective upper and lower sets of waveforms shown in FIGURE 8. It may be seen from FIGURE 8 that utilizing the ascending frequency sequence described above, a receding object causes the peak of the combined signal to shift forward in time while an approaching object causes the peak to shift backward in time. On the other hand, if a descending sequence beginning with $f_{15}$ is utilized, the effects on the combined signals are reversed. When it is considered that the total duration of the series of wave trains was, as stated above, approximately 3 seconds and that a change of only 3 milliseconds in the duration is clearly recognizable it may be seen that the method has a sensitivity of at least one part in 2000 for an active system and it appears that a change smaller by a factor of two could be detected. Considering an active system where the waves travel both to and from an object, where sound is utilized as the means of transmitting energy through water and the speed of sound is 5000 feet per second, a relative velocity of the object of 1.25 feet per second would be readily detected.

It is apparent from examination of FIGURE 8 that an indication of the relative motion of the objects may be obtained by holding the first time relationships and the second time relationships fixed and comparing the waveform or the position of the peak of the composite signal with the waveform produced when there is no relative motion of the objects. Moreover, it is apparent that such indications of relative motion could be obtained by using, as a standard, a waveform obtained when the objects have a predetermined relative motion which is other than zero. This may be accomplished, for example, by suitable visual display of the composite signal as on an oscilloscope. Other methods of determining the relative motion could include using a conventional correlator 22A to apply correlation techniques to the actual signal and the signal produced when there is a predetermined relative motion of the objects, which predetermined relative motion, of course, could be zero in a particular application. The use of such techniques could not, however, produce as a result as rapidly as visual display.

A related technique for determining relative velocity is based on the fact that reversing the order of frequencies transmitted reverses the effects on the position of the peak of the composite signal caused by receding and approaching objects. This method generally comprises transmitting two signals utilizing the same range of frequencies at approximately the same time in one of which transmitted signals the frequencies of the wave trains go from low to high while in the other signal the sequence is from high to low. As a specific example consider a set of frequencies in which the number of frequencies ($n$) is even. One of the transmitted signals begins with a wave train of the lowest frequency $f_1$ and proceeds successively through wave trains with the odd numbered frequencies in the set, ($f_3, f_5, \ldots$) to a wave train with the next to highest frequency $f_n-1$. The other transmitted signal begins with a wave train of the highest frequency $f_n$ and proceeds through wave trains with the alternate even numbered frequencies in the set ($f_n-2, f_n-4, \ldots$) to a wave train of the next to lowest frequency $f_2$. The greatest sensitivity to changes in velocity using this method is obtained when the respective wave trains comprising the two signals are interleaved in their order of transmission, specifically by being successively transmitted in the order $f_1, f_n, f_3, f_n-2, \ldots f_n-3, f_4, f_n-1, f_2$. The relative position of the peaks of the two composite signals when there is no relative motion may be predetermined by suitable adjustment of the first and second time relationships, which, of course, may be such as to make the peaks coincide in such a case. If there is relative motion of the objects and the time relationships are left unchanged from the above mentioned adjustment, the relative position of the peaks will change in opposite directions and the observed change from their predetermined relative position when there is no relative motion is indicative of the relative motion of the objects. Utilizing this technique, one actually observes the relative position of the peaks of two composite signals. However, utilizing very similar frequency sets, the shifts of position from the predetermined position are equal and opposite. This method is particularly applicable when the relative velocity is so large that the composite signal is not just a distorted signal as illustrated in FIGURE 8, but two separate bundles of energy can be picked out. The separation or the two peaks of bundles of energy is proportional to the duration of the signal train and the relative velocity of the scattering object.

The above modes of practicing the invention isolated all the information concerning velocity in the waveform of the composite signal. An alternative method of determining relative velocity which is especially suitable for the production of more exact quantitative results generally comprises comparing the differences between the first and second time relationships with the differences between such first and second time relationships as result in the production of a predetermined waveform when there is a predetermined relative motion of the objects. Then the desired information will be contained primarily in the differences between the first and second time relationships. Preferably, this comparison of the time relationships is made by adjusting the differences between the first and second time relationships so that the composite signal is maintained in a predetermined waveform and measuring the amount of the required adjustments. Although it is within the scope of the present invention to vary both the first and second time relationships simultaneously to accomplish this result, it is a convenient procedure to hold one of the time relationships constant while varying the other.

In one particular embodiment of this mode of practicing the invention, the first time relationships between the transmitted signals are selectively varied while the second time relationships in which the detected signals are combined are held fixed. The first time relationships which it is determined cause a predetermined waveform such as would result when there is a predetermined relative motion of the objects are indicative of the relative motion of the objects. More particularly, the first time relationships may be chosen to be the intervals between predetermined cycles of successive applied wave trains, specifically the last cycle (herein designated as $t_1, t_2, \ldots f_n-1$). The second time relationships may be chosen to be such that the intervals between cycles of the detected wave trains corresponding to such cycles of the applied wave trains are each reduced by the respective first time intervals, or in other words, the relative delay times are made equal to the first time intervals. If there is no relative motion of the objects the composite signal with this choice of time relationships will be similar to the Ricker wavelet illustrated in FIGURE 7. Adjustment of the first time intervals so that such a waveform is produced when there is a relative motion of the objects provides a measure of such relative motion. The change in the first time intervals which is required is proportional to the ratio of the relative velocity to the velocity of propagation of the waves in the medium. The time of the peak of the compressed signal may, of course, concomitantly be related to a reference datum as was previously described herein so as to provide a measure of the travel time of the waves and hence, since the velocity of propagation of the waves will be known, of the range of the objects.

A further embodiment of this mode of practicing the invention comprises holding the first time relationships fixed while selectively varying the second time relationships to provide a measure of relative velocity. This may be accomplished in a variety of ways. For example, in the apparatus shown in FIGURE 5, the reading heads 25 may be relatively movable around the recording drum 18. The spacing between the heads may thereby be varied with a consequent measurable change in the second time relationships which may be related to the relative motion of the objects. Alternatively the spacing of the heads 25 could be fixed while the velocity of the drum is varied to accomplish the same result. Similarly, in the apparatus of FIGURE 4, the spacing of the recording heads 17 could be varied or the velocity of the drum 18 could be varied so as to change the second time relationships in a consequent measurable amount which may be related to the relative motion of the objects.

Figure 9:
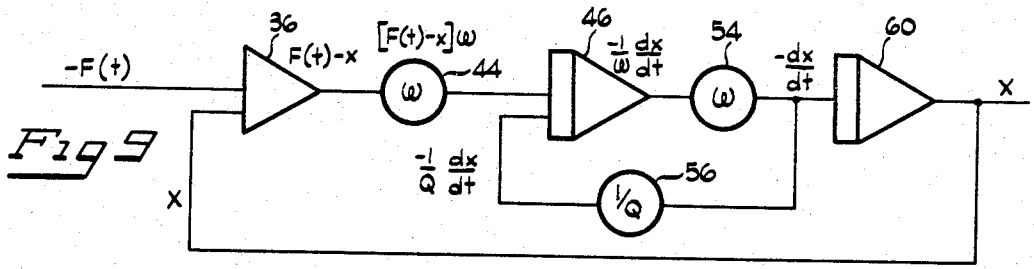
FIGURE 9 is a diagrammatic illustration of one embodiment of a filter useful in the system shown in FIGURES 4, 5 and 6.

It has been found preferable to utilize as the filters 16 so-called operational filters in the form of a narrow band active filter having adjustable frequency and Q controls. The filter is based upon the analog simulation of the differential equation of a damped linear oscillator that is excited by an input signal of the resonant frequency. The frequencies and Q controls are adjusted to provide a filter response approximating the correlation function for the particular wave train frequency and length. The differential equation is:

$$\frac{d^2x}{dt^2} + \frac{\omega dx}{Qdt} + \omega^2 x = \omega^2 F(t)$$

where $F(t)$ is the input function which contains a desired received signal characterized by the effective resonant filter frequency mixed with varying amounts of noise. This converts to $$\frac{1}{\omega}\frac{d^2x}{dt^2} = \omega[F(t) - x] - \frac{1}{Q}\frac{dx}{dt}$$

which can be set up in analog form as in FIGURE 9.

It should be noted that $\omega$ for a 100 c.p.s. signal would be 628 while a coefficient potentiometer yields a number only from 0 to 1. For this reason the $\omega$ setting is really $\omega/1000$ and both such settings are followed by integrators with a gain of 1000 to compensate. This also keeps the integration capacitors from being excessively large.

Figure 10:
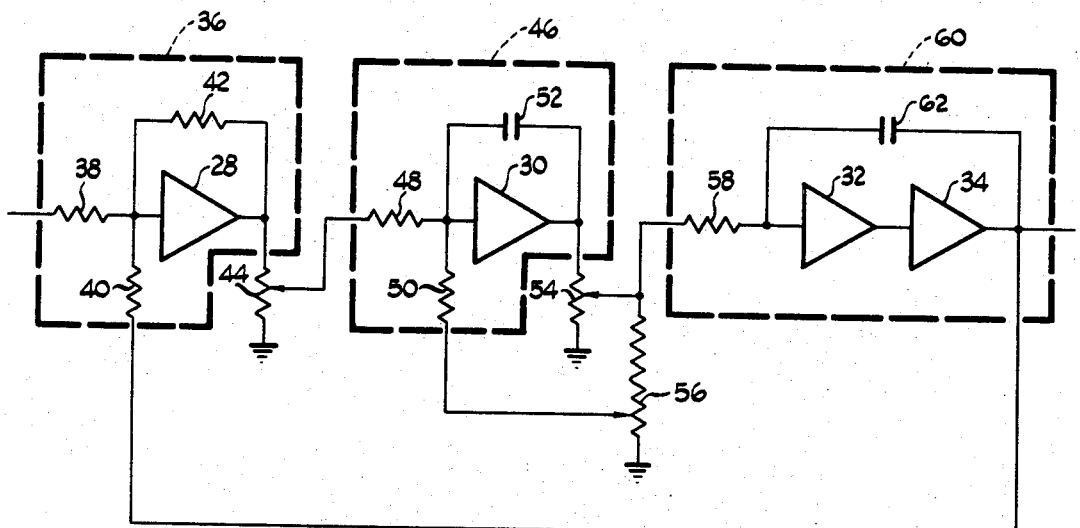
FIGURE 10 is a schematic illustration of the filter shown in FIGURE 9.

The basic schematic is preferably as shown in FIGURE 10.

The filter includes amplifiers 28, 30, 32 and 34. Amplifiers 28, 30 and 32 may be small conventional operational amplifiers having a frequency response of 0 to 10 kilocycles. Amplifier 34 may be a symmetrical emitter follower to provide a low impedance output. Amplifier 28 is part of a summing amplifier 36 to which an input signal is applied at each of input resistors 38 and 40 and which includes a feedback resistor 42. Potentiometer 44 is a frequency control coupled between the output of summing amplifier 36 and an integrating amplifier 46 having input resistors 48 and 50, amplifier 30 and a feedback capacitor 52. The output of the amplifier 46 is applied to another potentiometer 54 which is also a frequency control. The output from the frequency control 54 is applied to a potentiometer 56 which is a Q control and is also applied through an input resistor 58 which is part of an integrator 60, which also includes amplifiers 32 and 34 and feedback capacitor 62. The signal from the Q control 56 is applied through resistor 50 to integrator 46. The output of the integrator 60 is then the filter output passed to a recording head. It is also fed back to an input of the amplifier 36.

The operation of the amplifier may be readily understood by reference to FIGURE 9 which is a functional illustration of the filter. The operational filter is normally adjusted so that the buildup of the filter output over the duration of a single idealized detection signal and the ringing decay of the filter after the cessation of the signal form an approximately triangular envelope as shown in FIGURE 3. Amplifier 36 sums its input signals $-F(t)$ and $x$ and inverts the sum to produce a signal $F(t) - x$. Potentiometer 44 (with appropriate amplifier gain) multiplies the sum by $\omega$ to produce a signal $[F(t)-x]\omega$. Integrator 46 adds this signal to a signal representative of $$\frac{-1dx}{Qdt}$$

to produce a signal $$[F(t)-x]\omega - \frac{1dx}{Qdt}$$

which as noted above is equal to $$\frac{1}{\omega}\frac{d^2x}{dt^2}$$

integrator 46 then integrates this to produce a signal $$\frac{-1dx}{\omega dt}$$

which is multiplied by $\omega$ by potentiometer 54 (with appropriate amplifier gain) to produce a signal representative of $$\frac{-dx}{dt}$$

This signal is multiplied by $1/Q$ by the Q control potentiometer 56 to provide an input signal for integrator 46. It is also integrated to produce the signal $x$ which is the filter output and also an input signal to amplifier 36.

The filter is tuned by the adjustment of potentiometers 44 and 54. The adjustment may be made by movement of a conventional frequency control switch (not shown) to provide the appropriate frequency. The Q control 56 may be similarly adjusted.

The operational filter as described in connection with FIGURES 9 and 10 features independent frequency and Q controls. However, in the case of a system utilizing sets of frequencies and numbers of cycles such that all pulse trains used are of approximately equal duration (period x number of pulses=constant) such as the set of frequencies and wave trains set forth in Table I, it is desirable to use a filter wherein the Q control is proportional to frequency while the frequency control is independent of Q. This can be accomplished by the filter shown in FIGURE 11.

Figure 11:
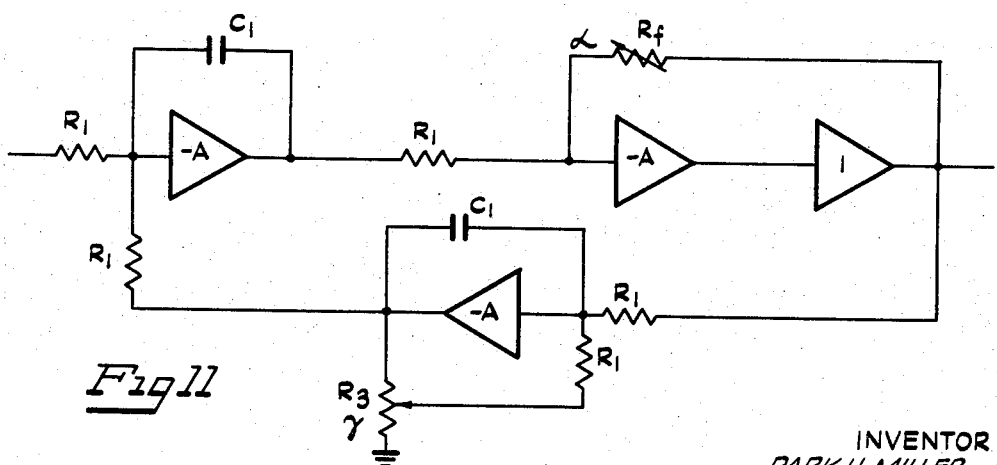
FIGURE 11 is a diagrammatic illustration of another embodiment of a filter useful in the system shown in FIGURES 4, 5 and 6.

A filter like that shown in FIGURE 11 is described in an article by F. T. May and R. A. Dandl, "Active Filter Element and Its Application to a Fourier Comb," Review of Scientific Instruments, April 1961, volume 32, No. 4, page 387. This circuit requires only a single frequency control rather than the dual frequency control of the filter of FIGURES 9 and 10, and provides the desired frequency dependence in the Q control. The bandwidth and gain of this circuit are substantially identical to those of the circuit shown in FIGURES 8 and 9. The pertinent relations are as follows:

$$f \text{ resonance} = \frac{\sqrt{\alpha}}{2\pi R_1 C_1}$$

$$Q = \frac{\sqrt{\alpha}}{\gamma}$$

$$\alpha = \frac{R_f}{R_1}$$

$$\gamma = \text{Ratio on } R_3$$

$$\text{Bandwidth on long wave train} = \frac{\alpha}{R_1 C_1}$$

$$\text{Gain at } f \text{ resonance on long wave trains} = \frac{\alpha}{\gamma}$$

The Q control by $\gamma$, need only be set once for a particular time length of pulse trains, and the only control requiring adjustment for different frequencies (as in correcting for Doppler shift) is the single frequency ($\alpha$) control. Thus, the control $\gamma$ can be adjusted to provide the desired Q, at a particular frequency for a wave train of the length being used, to produce the desired rate of rise and fall in the filter output. This setting of the control $\gamma$ then provides the desired Q for all other frequencies as determined by the control $\alpha$, the Q being also determined by the control $\alpha$, and hence being frequency dependent. This produces a Q that increases with frequency, which is desirable when there is appreciable increased attenuation of the higher frequencies in the transmission of the waves. Such attenuation occurs and may present great difficulties when the signals are seismic wave trains in the earth, especially when frequencies above 70 c.p.s. are utilized. On the other hand, when the signals are low frequency sound waves in water, since there is relatively little attenuation below 3000 c.p.s., increased gain is not required for the attenuation of wave trains at 100 c.p.s. relative to wave trains of 30 c.p.s.

Various changes and modifications may be made in the above described method and apparatus for detection of range and velocity without departing from the present invention. For example, the first and second time relationships could be different from those specifically described, noise reducing techniques other than the described filters could be utilized, and the processing of the detected signals could be performed using other apparatus which would fall within the spirit and scope of the invention, various features of which are set forth in the accompanying claims.

What is claimed is:

1. A method of detecting relative motion of two objects in a medium, comprising the steps of:
   (a) applying a plurality of wave trains to the medium,
      (1) each of said applied wave trains being of limited duration and of a different respective frequency,
      (2) said applied wave trains having respective predetermined cycles occurring in first time relationships,
   (b) detecting the wave trains after they have traveled between the objects by producing detection signals each systematically related to one of said applied wave trains and having a cycle corresponding to said respective predetermined cycle thereof,
   (c) combining said detection signals with said corresponding cycles occurring in second time relationships to produce a compressed composite signal, and
   (d) utilizing the differences between said first time relationships and said second time relationships and the differences between said actual composite signal and such a composite signal as would be produced if there were a predetermined relative motion of the objects to provide an indication of the actual relative motion of the objects.

2. A method of detecting relative motion of two objects in a medium, comprising the steps of:
   (a) applying a plurality of wave trains to the medium,
      (1) each of said applied wave trains being of limited duration and of a different respective frequency,
      (2) said applied wave trains having respective predetermined cycles occurring in first time relationships,
   (b) detecting the wave trains after they have traveled between the objects by producing detection signals each systematically related to one of said applied wave trains and having a cycle corresponding to said respective predetermined cycle thereof,
   (c) combining said detection signals with said corresponding cycles occurring in second time relationships to produce a compressed composite signal, and
   (d) comparing said actual composite signal and such a composite signal as would be produced by combining said detection signals in said second time relationships if there were a predetermined relative motion of the objects to provide an indication of the actual relative motion of the objects.

3. A method of detecting relative motion to two objects in a medium, comprising the steps of:
   (a) applying a plurality of first wave trains to the medium,
      (1) each of said applied first wave trains being of limited duration and of a different respective frequency,
      (2) said applied first wave trains having first time relationships,
      (3) said applied first wave trains being applied in the order of increasing frequency,
   (b) applying a plurality of second wave trains to the medium,
      (1) each of said applied second wave trains being of limited duration and of a different respective frequency,
      (2) said applied second wave trains having second time relationships,
      (3) said applied second wave trains being applied in the order of decreasing frequency,
   (c) detecting said first wave trains after they have traveled between the objects by producing first detection signals each systematically related thereto,
   (d) detecting said second wave trains after they have traveled between the objects by producing second detection signals each systematically related thereto,
   (e) combining said first detection signals in third time relationships to produce a first composite signal,
   (f) combining said second detection signals in fourth time relationships to produce a second composite signal, and
   (g) comparing said first and second composite signals to provide an indication of relative motion of the objects.

4. The method according to claim 3 wherein said first and second wave trains are alternatively applied to the medium.

5. A method of detecting relative motion of two objects in a medium, comprising the steps of:
   (a) applying a plurality of wave trains to the medium,
      (1) each of said applied wave trains being of limited duration and of a different respective frequency,
      (2) said applied wave trains having respective predetermined cycles occurring in first time relationships,
   (b) detecting the wave trains after they have traveled between the objects by producing detection signals each systematically related to one of said applied wave trains and having a cycle corresponding to said respective predetermined cycle thereof,
   (c) combining said detection signals with said corresponding cycles occurring in second time relationships to produce a compressed composite signal, said first time relationships and said second time relationships being such that said composite signal has a predetermined waveform when there is a predetermined relative motion of the objects, and
   (d) comparing the actual waveform of said composite signal with said predetermined waveform to provide an indication of the actual relative motion of the objects.

6. A method of detecting relative motion of two objects in a medium, comprising the steps of:
   (a) applying a plurality of wave trains to the medium,
      (1) each of said applied wave trains being of limited duration and of a different respective frequency,
      (2) said applied wave trains having respective predetermined cycles occurring in first time intervals,
   (b) detecting the wave trains after they have traveled between the objects by producing detection signals each systematically related to one of said applied wave trains and having a cycle corresponding to said respective predetermined cycle thereof and occurring at second time intervals,
   (c) combining said detection signals in the time relationships with each other such that said respective second time intervals between cycles of said detection signals corresponding to said predetermined cycles of said applied wave trains are each reduced by said respective first time intervals to produce a compressed composite signal, and (d) comparing the waveform of said actual composite signal with the waveform of a composite signal as would be produced by combining said detection signals in time relationships with each other such that all said detection signals are substantially in phase during their cycles corresponding to said predetermined cycles of said applied wave trains to provide an indication of the actual relative motion of the objects.

7. The method according to claim 6 wherein said predetermined cycles of said applied wave trains are the last cycles thereof.

8. The method according to claim 7 wherein said applied wave trains are of substantially the same duration and said first time intervals are substantially equal.

9. The method according to claim 6 wherein said applied wave trains are applied at predetermined times in respect to a reference datum, said wave trains are detected in respect to said reference datum, said detection signals are combined to produce said actual composite signal time related to said reference datum, and wherein the time relationship of said actual composite signal and said reference datum is utilized as an indication of the range of the objects.

10. The method according to claim 9 wherein said predetermined cycles of said applied wave trains are the last cycles thereof.

11. The method according to claim 10 wherein said detection signals are recorded as a function of time relative to said reference datum prior to being combined, the recorded detection signals being thereafter combined.

12. The method according to claim 6 wherein each of said wave trains are selectively detected through a narrow band-pass filter selectively tuned to the respective one of said frequencies.

13. The method according to claim 12 wherein each of said filters is tuned to the respective one of said frequencies as modified by the Doppler effect.

14. A method of detecting relative motion of two objects in a medium, comprising the steps of:
(a) applying a plurality of wave trains to the medium,
(1) each of said applied wave trains being of limited duration and of a different respective frequency,
(2) said applied wave trains having respective predetermined cycles occurring in first time relationships,
(b) detecting the wave trains after they have traveled between the objects by producing detection signals each systematically related to one of said applied wave trains and having a cycle corresponding to said respective predetermined cycle thereof,
(c) combining said detection signals with said corresponding cycles occurring in second time relationships to produce a predetermined compressed composite signal, and
(d) comparing the differences between said actual first and said actual second time relationships with the differences between such first and second time relationships as would result in production of said predetermined compressed composite signal if there were a predetermined relative motion of the objects to provide an indication of the actual relative motion of the objects.

15. The method according to claim 14, wherein said first time relationships are variable, said second time relationships are fixed and said first time relationships are selectively varied to produce said predetermined composite signal.

16. The method according to claim 14, wherein said first time relationships are fixed, said second time relationships are variable and said second time relationships are selectively varied to produce said predetermined composite signals.

17. The method according to claim 16 wherein said second time relationships are selectively varied by recording each of said detection signals on a recording drum, reading out said recorded signals through a plurality of reading heads relatively movable along said drum, and moving said reading heads along said drum while combining the outputs of said reading heads.

18. The method according to claim 16 wherein said second time relationships are selectively varied by recording each of said detection signals on a recording drum having variable speed, and reading heads fixed relative to each other and varying the speed of said recording drum while combining the outputs of said reading heads.

19. A method of detecting relative motion of two objects in a medium, comprising the steps of:
(a) applying a plurality of wave trains to the medium,
(1) each of said applied wave trains being of limited duration and of a different respective frequency,
(2) said applied wave trains having respective predetermined cycles occurring at predetermined time intervals
(b) detecting the wave trains after they have traveled between the objects by producing detection signals, each systematically related to one of said applied wave trains and having a cycle corresponding to said respective predetermined cycle thereof,
(c) combining said detection signals with said corresponding cycles occurring in time relationships with each other such that all said detection signals are substantially in phase during their cycles corresponding to said predetermined cycles of said applied wave trains to produce a compressed composite signal, and
(d) comparing said time relationships with said predetermined time intervals to provide an indication of the actual relative motion of the objects.

20. The method according to claim 19 wherein said predetermined cycles of said applied wave trains are the last cycles thereof.

21. The method according to claim 20 wherein said applied wave trains are of substantially the same duration and said first time intervals are substantially equal.

22. The method according to claim 19 wherein said applied wave trains are applied at predetermined times in respect to a reference datum, said wave trains are detected in respect to said reference datum, said detection signals are combined to produce said composite signal time related to said reference datum, and wherein the time relationship of said composite signal and said reference datum is utilized as an indication of the range of the objects.

23. A system for detection of relative motion of two objects in a medium comprising:
(a) transmitting means adapted for applying a plurality of wave trains to the medium,
(1) each of said applied wave trains being of limited duration and of a different respective frequency,
(2) said applied wave trains having respective predetermined cycles occurring in first time relationships,
(b) detection means responsive to said wave trains adapted for detecting the wave trains after they have traveled between the objects by producing detection signals each systematically related to one of said applied wave trains and having a cycle corresponding to said respective predetermined cycle thereof,
(c) signal combination means adapted for combining said detection signals with said corresponding cycles occurring in second time relationships to produce a compressed composite signal, (d) time comparison means adapted for indicating differences between said first time relationships and said second time relationships, and (e) signal display means adapted for displaying said composite signal, whereby said differences between said first and second time relationships and between said actual composite signal and a predetermined composite signal indicate the actual relative motion of the objects.

24. A system for detection of range and relative motion of two objects in a medium comprising:
(a) transmitting means adapted for applying a plurality of wave trains to the medium,
  (1) each of said applied wave trains being of limited duration and of a different respective frequency,
  (2) said applied wave trains having first time intervals between a reference datum and the times of occurrence of predetermined cycles of respective applied wave trains,
(b) detection means responsive to said wave trains adapted for detecting the wave trains after they have traveled between the objects by producing detection signals systematically related thereto,
(c) band-pass filter means adapted for selecting from each of said detection signals only the component at the respective one of said frequencies, thus producing filtered detection signals each systematically related to one of said applied wave trains and having a cycle corresponding to said respective predetermined cycle thereof,
(d) recording means adapted for recording each of said filtered detection signals as a function of time relative to said reference datum,
(e) signal combination means adapted for combining said recorded filtered signals in the time relationships with each other such that respective second time intervals between said reference datum and said corresponding cycles of said recorded filtered signals are each reduced by said respective first time intervals to produce a first composite signal time related to said reference datum,
(f) signal comparison means adapted for indicating differences between said first composite signal and a second composite signal as produced by combining said recorded signals in time relationships with each other such that all said recorded signals are substantially in phase during their cycles corresponding to said predetermined cycles of said applied wave trains, and
(g) output means responsive to said differences between said composite signals and the time relationship of said first composite signal and said reference datum for indicating range and relative velocity of the objects.

25. A system for detection of relative velocity of two objects in a medium comprising:
(a) transmitting means for applying a plurality of wave trains to the medium,
  (1) each of said applied wave trains being of limited duration and of a different respective frequency,
  (2) said applied wave trains having respective predetermined cycles occurring in fixed first time relationships,
(b) detection means responsive to said wave trains for detecting the wave trains after they have traveled between the objects by producing detection signals systematically related thereto,
(c) band-pass filter means for selecting from said detection signals only the component at the respective one of said frequencies, thus producing filtered detection signals each systematically related to one of said applied wave trains and having a cycle corresponding to said respective predetermined cycle thereof,
(d) a recorder having a plurality of tracks,
(e) recording means for recording each of said filtered detection signals on a respective one of said tracks, said recording means being relatively movable along said tracks, and
(f) signal combination means for combining said recorded signals while moving said recording means along said tracks so as to produce a predetermined waveform, whereby relative velocity of the objects is indicated by the relative position of said recording means.

26. A system for detection of relative velocity of two objects in a medium comprising:
(a) transmitting means for applying a plurality of wave trains to the medium,
  (1) each of said applied wave trains being of limited duration and of a different respective frequency,
  (2) said applied wave trains having respective predetermined cycles occurring in fixed first time relationships,
(b) detection means responsive to said wave trains for detecting the wave trains after they have traveled between the objects by producing detection signals systematically related thereto,
(c) band-pass filter means for selecting from said detection signals only the component of the respective one of said frequencies, thus producing filtered detection signals each systematically related to one of said applied wave trains and having a cycle corresponding to said respective predetermined cycle thereof,
(d) a recorder having variable speed and a plurality of parallel tracks,
(e) recording means for recording each of said filtered detection signals on a respective one of said tracks, and
(f) signal combination means for combining said recorded signals while varying the speed of said recorder so as to produce a predetermined waveform, whereby relative velocity of the objects is indicated by the speed of said recorder.

27. A system for detection of relative velocity of two objects in a medium comprising:
(a) transmitting means for applying a plurality of wave trains to the medium,
  (1) each of said applied wave trains being of limited duration and of a different respective frequency,
  (2) said applied wave trains having respective predetermined cycles occurring in fixed first time relationships,
(b) detection means responsive to said wave trains for detecting the wave trains after they have traveled between the objects by producing detection signals systematically related thereto,
(c) a recorder having variable speed and a movable record medium,
(d) recording means for recording said detection signals on said record medium,
(e) band-pass filter means for selecting from said detection signals only the component at the respective one of said frequencies, thus producing filtered detection signals each systematically related to one of said applied wave trains and having a cycle corresponding to said respective predetermined cycle thereof,
(f) reading heads spaced along said record medium and responsive to said recorded signals for applying said recorded signals to said band-pass filter means, and
(g) signal combination means for combining said filtered signals while varying the speed of said medium so as to produce a predetermined waveform whereby relative velocity of the objects is indicated by the speed of said medium.

28. A system for detection of relative velocity of two objects in a medium comprising:
  (a) transmitting means for applying a plurality of wave trains to the medium,
    (1) each of said applied wave trains being of limited duration and of a different respective frequency,
    (2) said applied wave trains having respective predtermined cycles occurring in fixed first time relationships,
  (b) detection means responsive to said wave trains for detecting the wave trains after they have traveled between the objects by producing detection signals systematically related thereto,
  (c) a recorder having a movable record medium,
  (d) recording means for recording said detection signals on said record medium,
  (e) band-pass filter means for sslecting from said recorded signals only the component at the respective one of said frequencies, thus producing filtered signals each systematically related to one of said applied wave trains and having a cycle corresponding to said respective predetermined cycle thereof,
  (f) movable reading heads spaced along said record medium and responsive to said recorded signals for applying said recorded signals to said band-pass filter means,
  (g) signal combination means for combining said filtered signals while moving said reading heads so as to produce a predetermined waveform whereby relative velocity of the objects is indicated by the relative position of said heads.

29. In a system for detection of relative motion of two objects in a medium wherein a plurality of wave trains are applied to the medium, each of said wave trains being of limited duration and of a different respective frequency, said applied wave trains having respective predetermined cycles occurring in first time relationships, detection means responsive to said wave trains for detecting the wave trains after they have traveled between the objects by producing detection signals each systematically related to one of said applied wave trains and having a cycle corresponding to said respective predetermined cycle thereof, signal combination means for combining said detection signals with said corresponding cycles occurring in second time relationships to produce a composite signal, time comparison means for indicating differences between said first time relationships and said second time relationships, and signal display means for displaying said composite signal, whereby said differences between said first and second relationships and between said actual composite signal and a predetermined composite signal indicate the actual relative motion of the objects.

References Cited

UNITED STATES PATENTS

| | | | |
|---|---|---|---|
| 2,951,160 | 8/1960 | McCartney | 343—7.7 X |
| 3,176,296 | 3/1965 | Adams | 343—17.2 |
| 3,212,053 | 10/1965 | Finney | 343—17.2 X |
| 3,229,284 | 1/1966 | Rubin | 343—9 |
| 3,299,427 | 1/1967 | Kondo | 343—17.2 |
| 3,302,162 | 1/1967 | Rowlands | 343—7.7 X |
| 3,309,700 | 3/1967 | Garrison | 343—17.2 X |

RODNEY D. BENNETT, *Primary Examiner.*

C. L. WHITHAM, *Assistant Examiner.*